US005778671A

United States Patent [19]

Bloomquist et al.

[11] Patent Number: 5,778,671

[45] Date of Patent: Jul. 14, 1998

[54] ELECTROHYDRAULIC SYSTEM AND APPARATUS WITH BIDIRECTIONAL ELECTRIC-MOTOR/HYDRAULIC-PUMP UNIT

[75] Inventors: James V. Bloomquist, Holland, Ohio; Albin J. Niemiec, Romeo, Mich.

[73] Assignee: Vickers, Inc., Maumee, Ohio

[21] Appl. No.: 712,671

[22] Filed: Sep. 13, 1996

[51] Int. Cl.[6] .................................................... F16D 31/02

[52] U.S. Cl. ............................ 60/456; 60/464; 60/465; 60/476; 60/441; 417/371

[58] Field of Search ............................ 60/456, 464, 465, 60/476, 441; 417/371

[56] References Cited

U.S. PATENT DOCUMENTS

| | | | |
|---|---|---|---|
| 3,864,911 | 2/1975 | Gellatly et al. | 60/453 |
| 4,008,571 | 2/1977 | Evans | 60/486 |
| 4,630,441 | 12/1986 | Chamberlain | 60/413 |
| 4,729,717 | 3/1988 | Gupta . | |
| 4,761,953 | 8/1988 | Rosman | 60/464 |
| 5,073,091 | 12/1991 | Burgess et al. . | |
| 5,109,672 | 5/1992 | Chenoweth et al. | 60/456 |
| 5,141,402 | 8/1992 | Bloomquist . | |
| 5,181,837 | 1/1993 | Niemiec . | |
| 5,261,796 | 11/1993 | Niemiec et al. | 417/371 |
| 5,320,501 | 6/1994 | Largosch et al. . | |
| 5,354,182 | 10/1994 | Niemiec et al. . | |

FOREIGN PATENT DOCUMENTS

| | | | |
|---|---|---|---|
| 379124 | 8/1932 | United Kingdom | 60/476 |

OTHER PUBLICATIONS

Vickers, Inc., "Integrated Motor Pump—The Power of Two in One," Jan., 1994.

Machine Design, Jan. 25, 1996, p. 26.

*Primary Examiner*—F. Daniel Lopez

*Attorney, Agent, or Firm*—Barnes, Kisselle, Raisch, Choate, Whittemore & Hulbert, P.C.

[57] ABSTRACT

An electrohydraulic control system that includes a bidirectional electric motor responsive to application of electrical power for rotation in either of two directions, and a hydraulic pump coupled to the motor and having ports for supplying hydraulic fluid in either of two flow directions as a function of direction of rotation of the electric motor. A hydraulic actuator is coupled to the pump for receiving fluid in either of two flow directions and performing work as a function thereof. An electronic controller applies electrical power to the electric motor so as to obtain a desired level of work at the actuator. The electronic controller includes one or more sensors operatively coupled to the actuator for applying electrical power to the motor as a function of motion at the actuator. The bidirectional electric motor in the preferred embodiments of the invention comprises a fluid-cooled motor, and the system includes valves for routing hydraulic fluid through the motor housing between the pump and the actuator.

31 Claims, 4 Drawing Sheets

ELECTROHYDRAULIC SYSTEM AND APPARATUS WITH BIDIRECTIONAL ELECTRIC-MOTOR/HYDRAULIC-PUMP UNIT

The present invention is directed to electrohydraulic systems for controlling operation at a bidirectional actuator, and more particularly to a bidirectional electric-motor/hydraulic-pump unit for use in such a system.

BACKGROUND AND SUMMARY OF THE INVENTION

Electrohydraulic systems for controlling operation at a bidirectional actuator coupled to a load conventionally include electronic circuitry for applying electrical power to the motor, and solenoid-operated valves, such as servo valves or proportional valves, for controlling flow of fluid from the pump to the actuator and thereby controlling motion at the actuator. One or more sensors may be connected to the actuator, and/or the load coupled to the actuator, for feeding information indicative of motion at the actuator or load to control electronics and providing closed-loop control of position, velocity and/or acceleration at the actuator and load. Excess fluid flow from the pump is returned by the control valve(s), and represents power loss converted to heat. Attempts have been made to reduce such power loss by controlling pump displacement, which renders the pump mechanism undesirably expensive and complex. Furthermore, hydraulic controls are subject to variations in fluid viscosity, fluid temperature and system resonance stability.

It is therefore a general object of the present invention to provide an electrohydraulic control system having enhanced electronic control of operation at a bidirectional hydraulic actuator while eliminating one or more of the aforementioned deficiencies in the prior art. Specifically, it is an object of the present invention to provide an electrohydraulic control system in which electric control of directional hydraulic control valves is eliminated, and in which both direction and quantity of fluid flow to the actuator is controlled by variable operation at the motor and pump. Another object of the present invention is to provide a system of the described character in which electronic control is implemented by controlling application of electrical power to a bidirectional electric motor coupled to a bidirectional hydraulic pump. Another and related object of the present invention is to provide an integrated electric-motor/hydraulic-pump unit that includes a bidirectional electric motor, and one or more pumps mounted on and coupled to the motor for providing bidirectional fluid flow as a function of electrical power applied to the motor.

An electrohydraulic control system in accordance with the present invention includes a bidirectional electric motor (i.e., a reversible motor) responsive to application of electrical power for rotation in either of two directions, and a hydraulic pump coupled to the motor and having ports for supplying hydraulic fluid in either of two flow directions as a function of direction of rotation of the electric motor. A hydraulic actuator is coupled to the pump for receiving fluid in either of two flow directions and performing work as a function thereof. An electronic controller applies electrical power to the electric motor so as to obtain a desired level of work at the actuator. The electronic controller in the preferred embodiments of the invention includes one or more sensors operatively coupled to the actuator for applying electrical power to the motor as a function of motion at the actuator. The bidirectional electric motor in the preferred embodiments of the invention comprises a fluid-cooled motor, and the system includes hydraulic valves for routing hydraulic fluid through the motor housing between the pump and the actuator.

Valves are preferably operatively coupled to the pump and the actuator for controlling flow of fluid between the pump and the actuator. Such valves preferably comprise passive hydraulic valves responsive to direction and/or pressure of hydraulic fluid flow for controlling fluid flow between the pump and the actuator. The valves may comprise a pilot-operated check valve controlling the vent port of a two-stage pressure relief valve, a pilot-operated sequencing valve or a pilot-operated unloading valve for controlling direction of fluid flow through the actuator, and/or check valves for controlling direction of fluid flow between fluid ports on the pump and the actuator.

The bidirectional electric motor in the preferred embodiments of the invention has a motor output shaft that is coupled to the bidirectional hydraulic pump. The motor has one or more endplates into which the shaft extends. In some embodiments of the invention, the hydraulic pump comprises a bidirectional pump mounted on one motor endplate and directly coupled to the shaft. In other embodiments of the invention, the hydraulic pump comprises a pair of unidirectional hydraulic pumps, preferably mounted on opposed motor endplates and coupled to the motor shaft by a pair of directional couplers such that the pumps are alternately coupled to the shaft as a function of direction of rotation of the shaft. The pump (or pumps) have ports that function as inlet and outlet ports, and the system further includes valves responsive to direction and/or pressure of hydraulic fluid flow for controlling fluid flow between the actuator and the pump ports. The actuator likewise has a pair of ports, and the valves are responsive to direction and/or pressure of hydraulic fluid flow for controlling fluid flow to the actuator ports.

In accordance with a second aspect of the present invention an electric-motor/hydraulic-pump unit is provided as an integrated assembly that includes a bidirectional electric motor having a motor output shaft and at least one endplate into which the shaft extends, a hydraulic pump mounted on the motor endplate, and a coupler connecting the shaft to the pump. The pump may comprise a bidirectional pump directly coupled to the motor output shaft. Alternatively, the pump may comprise a pair of unidirectional pumps mounted on opposed endplates of the motor housing and coupled to the motor output shaft by a pair of unidirectional couplers that alternately connect the pumps to the shaft as a function of direction of rotation of the shaft. Most preferably, the electric motor is a fluid-cooled motor having a housing with ports for feeding fluid through the housing, and the motor housing is connected to the pump so that hydraulic fluid is routed between the motor housing and the pump. In the most preferred embodiments of the invention, the integrated motor/pump unit is surrounded by a sound-deadening enclosure through which fluid inlet and outlet ports extend.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
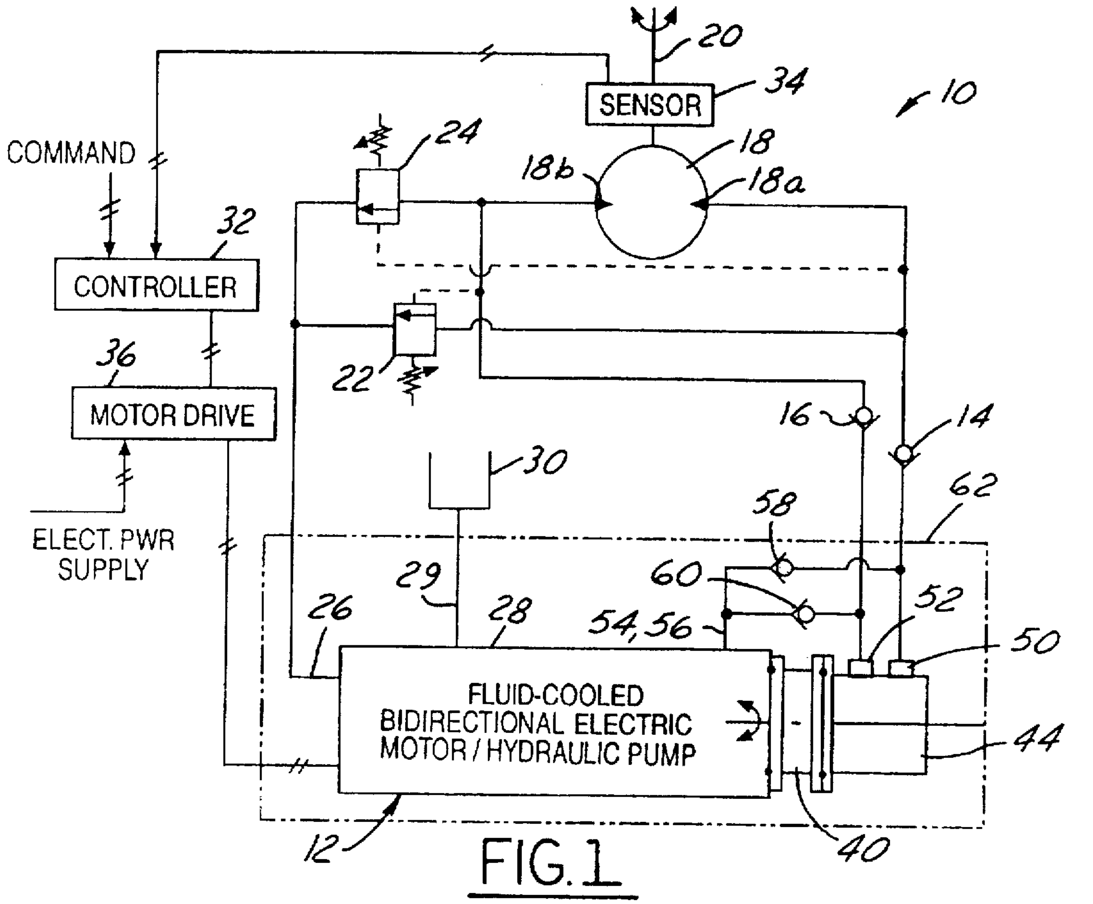
FIG. 1 is a functional block diagram of an electrohydraulic control system in accordance with one presently preferred embodiment of the invention.

FIG. 1 illustrates an electrohydraulic control system 10 in accordance with one presently preferred embodiment of the invention as comprising a fluid-cooled bidirectional integrated electric-motor/hydraulic-pump unit 12 having a pair of fluid ports 50, 52 connected through corresponding check valves 14, 16 to respective ports 18*a*, 18*b* of a bidirectional rotary fluid actuator 18. Actuator 18 has an output shaft 20 for connection to a suitable load (not shown). A pair of pilot-operated sequencing or unloading valves 22, 24 have inlet ports respectively connected to inlet ports 18*a*, 18*b* of actuator 18, and control ports connected to the opposing actuator inlet port. The fluid outlet ports of valves 22, 24 are connected to a fluid inlet port 26 on the motor housing 28 of integrated motor/pump unit 12. Housing 28 also receives make-up fluid through an inlet port 29 from a sump 30. An electronic controller 32 receives an input command signal from an external source (not shown), and provides an output control signal as a function of a difference between such command signal(s) and feedback signals from one or more sensors 34 connected to actuator 18 and/or the associated load. The output of controller 32 controls operation of motor drive electronics 36 so as to apply electrical power from a suitable source to the motor of integrated unit 12.

Figure 2:
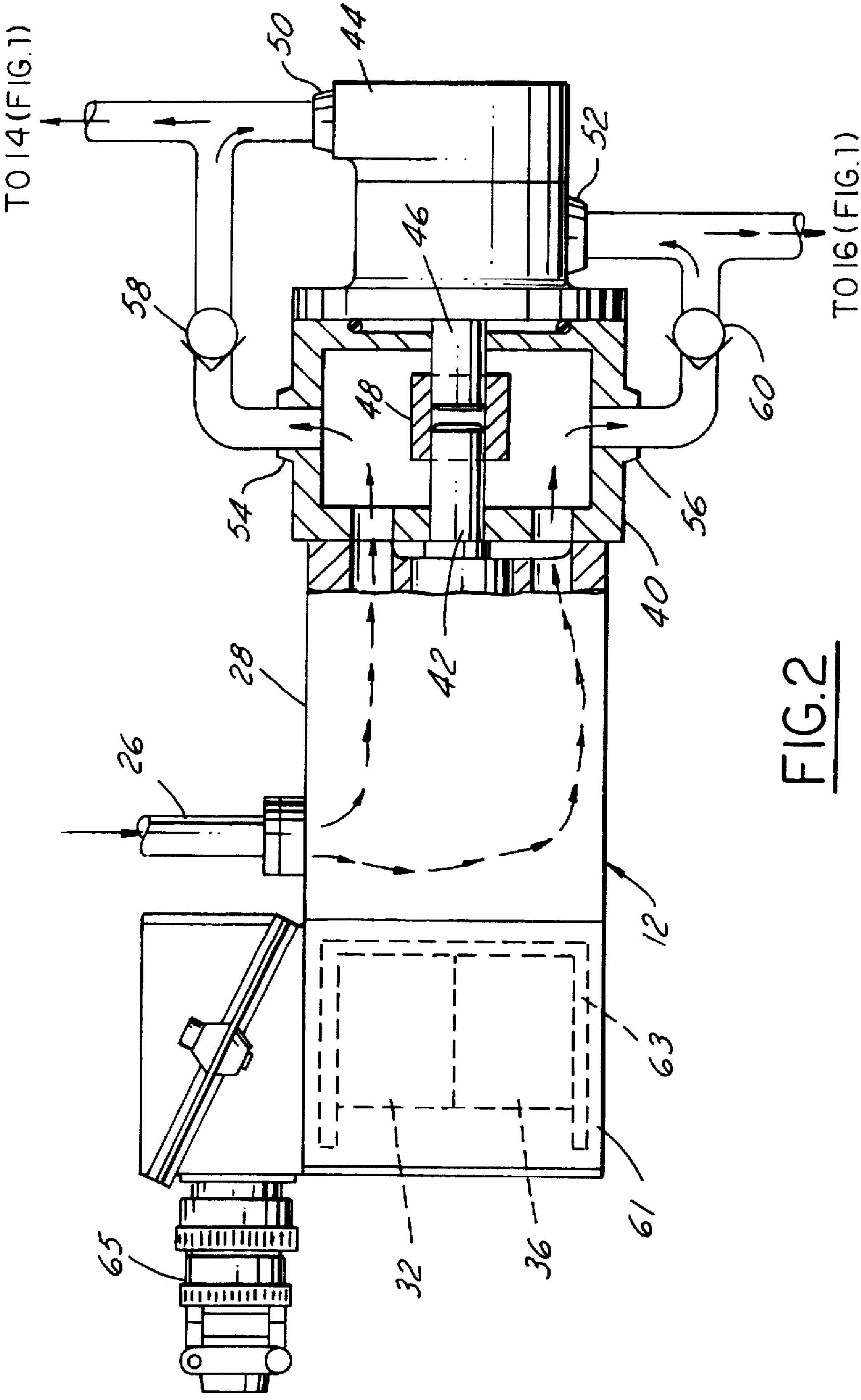
FIG. 2 is a schematic diagram of the fluid-cooled bidirectional electric-motor/hydraulic-pump unit in the system of FIG. 1.

FIG. 2 illustrates integrated motor/pump unit 12 in greater detail. Motor housing 28 has a housing spacer or endplate unit 40 into which motor output shaft 42 extends. A bidirectional hydraulic pump 44 is mounted on endplate 40, and has an input shaft 46 directly coupled to motor output shaft 42 by a coupler 48. Pump 44 has a pair of fluid ports 50, 52 that alternately function as fluid inlet and outlet ports depending upon the direction of rotation of the pump. Endplate 40 has a hollow interior into which shafts 42, 46 extend, and within which coupler 48 is disposed. Cooling fluid flows into and through motor housing 28 into the hollow interior of endplate 40, and out of a pair of endplate outlet ports 54, 56. Port 54 is connected through a check valve 58 to pump port 50, and port 56 is connected through a check valve 60 to pump port 52. Endplate 40 is mounted to motor housing 28 and pump 44 so as to form an integrated unitary assembly with fluid-tight seals between the motor, pump and endplate components. Most preferably, motor control electronics 32 and motor drive electronics 36 (FIG. 1) are mounted within an electronic enclosure 61 on a heat sink 63 for heat transfer with motor housing 28 and cooling by the fluid that passes through motor housing 28. Electronics 32, 36 receive electrical power and are connected to sensor 34 (FIG. 1) by means of a connector 65. Also most preferably, integrated motor/pump unit 12 with on-board electronics 32, 36 is disposed within and enclosed by a sound-deadening enclosure 62 (FIG. 1) made possible by fluid-cooling of the motor, as illustrated in U.S. Pat. No. 5,354,182.

In operation, assume first that motor/pump unit 12 is rotating in a direction such that pump port 52 is an inlet port. Fluid is drawn into port 52 through check valve 60 from port 56 (FIG. 2) of endplate 40. Fluid is fed under pressure from pump port 50 through check valve 14 to port 18*a* of actuator

18. When pressure at port 18*a* is such as to open valve 24, fluid is fed from actuator port 18*b* through valve 24 to housing inlet port 26 (FIGS. 1 and 2), and thence into the motor of motor/pump unit 12 to cool the motor windings. When actuator 18 has reached the desired position, as indicated by sensor 34 in a position control mode of operation, operation of motor/pump unit 12 is terminated by control electronics 32 and drive electronics 36, valve 24 closes and actuator 18 is hydraulically locked in position. To reverse operation, the motor/pump unit is operated in the reverse direction, such that port 50 becomes the pump inlet port so as to draw fluid from endplate port 54 through check valve 58. Fluid is fed under pressure from pump port 52 through check valve 16 to port 18*b* of actuator 18. When the pressure of such fluid reaches the control setting of sequencing or unloading valve 22, valve 22 opens so that fluid is fed from actuator port 18*a* through valve 22 and port 26 into the motor housing. There is thus formed, in either direction of motor/pump rotation, a closed fluid path through the motor housing to the pump. Any make-up fluid that is necessary is drawn from sump 30.

FIGS. 3–7 illustrate various modifications to the system of FIG. 1. In each of FIGS. 1–7 identical reference numerals indicate identical components, and reference numerals followed by a letter suffix indicate related components.

Figure 3:
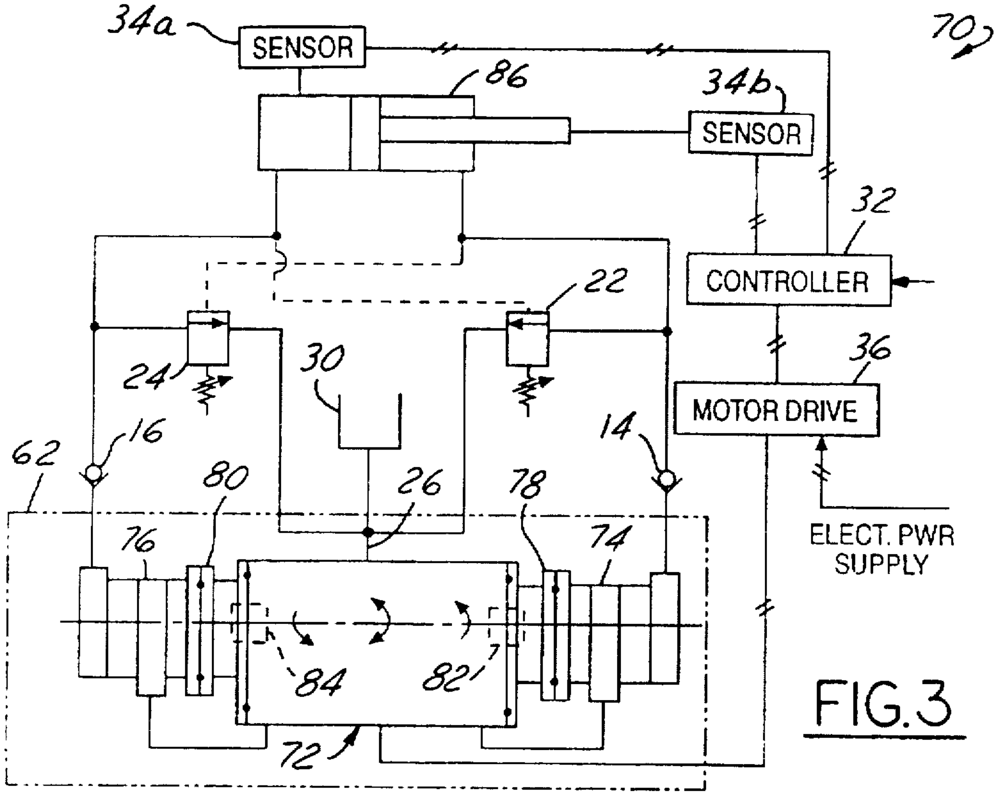
FIGS. 3–7 are functional block diagrams of respective alternative embodiments to the control system illustrated in FIG. 1.

FIG. 3 illustrates a modified control system 70, in which motor/pump unit 12 of FIG. 1 is replaced by an integrated fluid-cooled electric-motor/hydraulic-pump unit 72. In unit 72, a pair of unidirectional pumps 74, 76 are mounted on the axially spaced endplates 78, 80 of the motor housing. The motor within housing 72 is connected to the respective pumps by associated unidirectional couplers 82, 84, such that one or the other of the pumps 74, 76 is operatively coupled to the motor shaft during rotation in each direction, while the other pump unit is idle. Each pump 74, 76 has an associated inlet port that receives fluid from within the motor housing, and an outlet port connected through an associated check valve 14, 16 to an associated side of a single-rod linear actuator 86. Sequencing or unloading valves 22, 24 are connected as in the embodiment of FIG. 1 for selectively returning fluid from one or the other side of actuator 86 to inlet port 26 of motor/pump unit 72. Inlet port 26 also receives make-up fluid from sump 30. A pressure sensor 34*a* is connected to one cavity of actuator 86 for feeding a corresponding fluid pressure signal to controller 32. A position, velocity and/or acceleration sensor 34*b* is connected to the rod of actuator 86, or to the load coupled thereto, for feeding corresponding motion-indicating signals to controller 32. Thus, when the motor of motor/pump unit 72 is driven by controller 32 and amplifier 36 in one direction, in which pump 74 is coupled to the motor by coupler 82 and pump 76 is idle for example, fluid is fed through check valve 14 to one side of actuator 86. When the fluid pressure exceeds the setting of valve 24, fluid is fed from the opposing side of actuator 86 through valve 24 to motor housing inlet port 26. When the motor is actuated in the opposite direction, pump 76 is operative through check valve 16 and valve 22 to move actuator 86 in the opposite direction.

Figure 4:
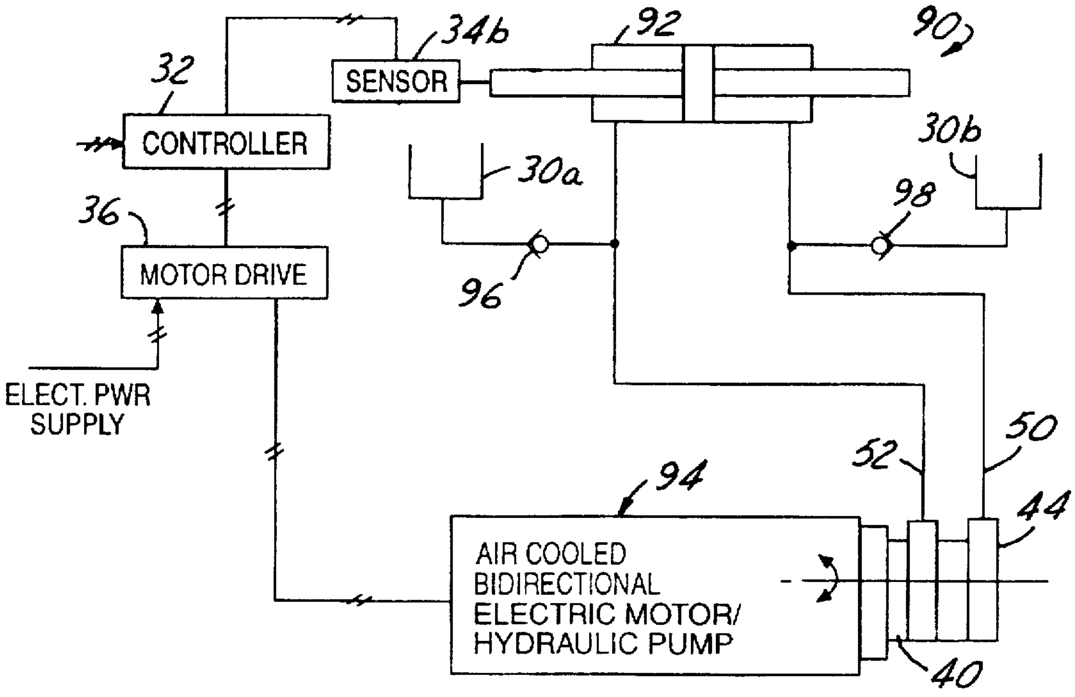

FIG. 4 illustrates a control system 90 for operating a double-rod linear actuator 92 from an air-cooled motor/pump unit 94. Port 50 of pump 44 is connected directly to one side of actuator 92, while the opposing side of actuator 92 is connected directly to pump port 52. The rod of actuator 92 is connected to a position, velocity and/or acceleration sensor 34*b* for feeding corresponding motion signals to controller 32. When motor/pump unit 94 is operated such that port 50 is an outlet port and port 52 is the inlet port, fluid is supplied under pressure to one side of actuator 92 and withdrawn from the opposite side. Make-up fluid is available from a sump 30a through a check valve 96. When motor/pump unit 94 operated in the reverse direction, fluid is fed under pressure from pump port 52 to the second side of actuator 92, and withdrawn from the first side of actuator 92 into pump inlet 50, again with make-up fluid being available from a sump 30b through a check valve 98.

Figure 5:
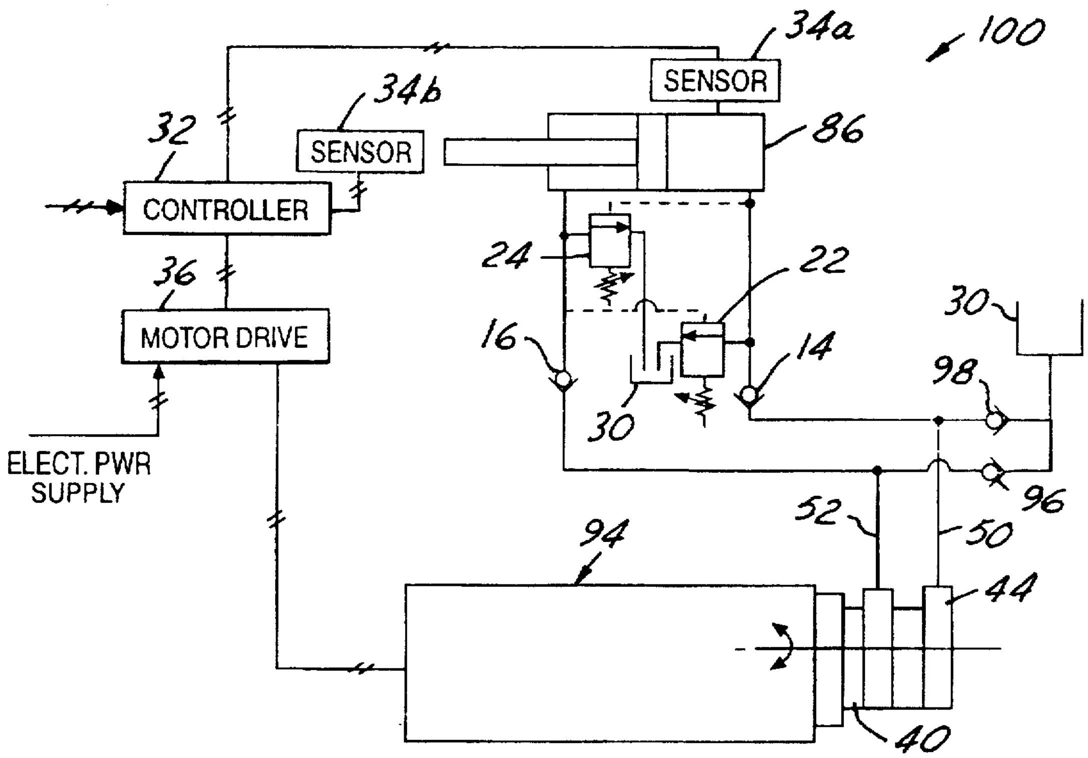

FIG. 5 illustrates a system 100 that features the combination of single-rod linear actuator 86 with associated sensors 34a, 34b, sequencing or unloading valves 22, 24 and check valves 14, 16 as in FIG. 3, with air-cooled bidirectional integrated electric-motor/hydraulic-pump unit 94 as in FIG. 4. Operation of system 100 in FIG. 5 will be self-evident from previous discussion.

Figure 6:
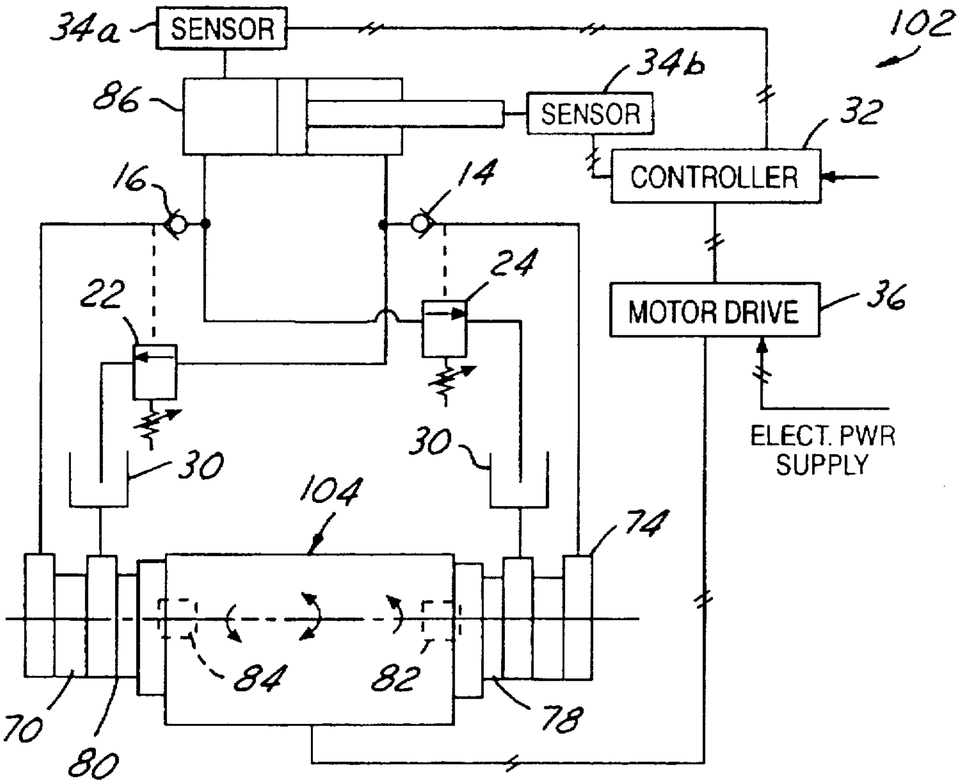

FIG. 6 illustrates a system 102 that features a single-rod linear actuator 86 with associated sensors 34a, 34b, check valves 14, 16 and sequencing or unloading valves 22, 24 as in FIG. 3, in combination with an air-cooled bidirectional motor/pump unit 104 having unidirectional pumps 74, 76 mounted on the endplates 78, 80 thereof, again as illustrated in FIG. 3. The primary difference between system 102 in FIG. 6 and system 70 in FIG. 3 is that the fluid is returned by valves 22, 24 to sump 30 connected to the inlet sides of unidirectional pumps 74, 76 in FIG. 6, rather than to the motor housing fluid inlet 26 in FIG. 3.

Figure 7:
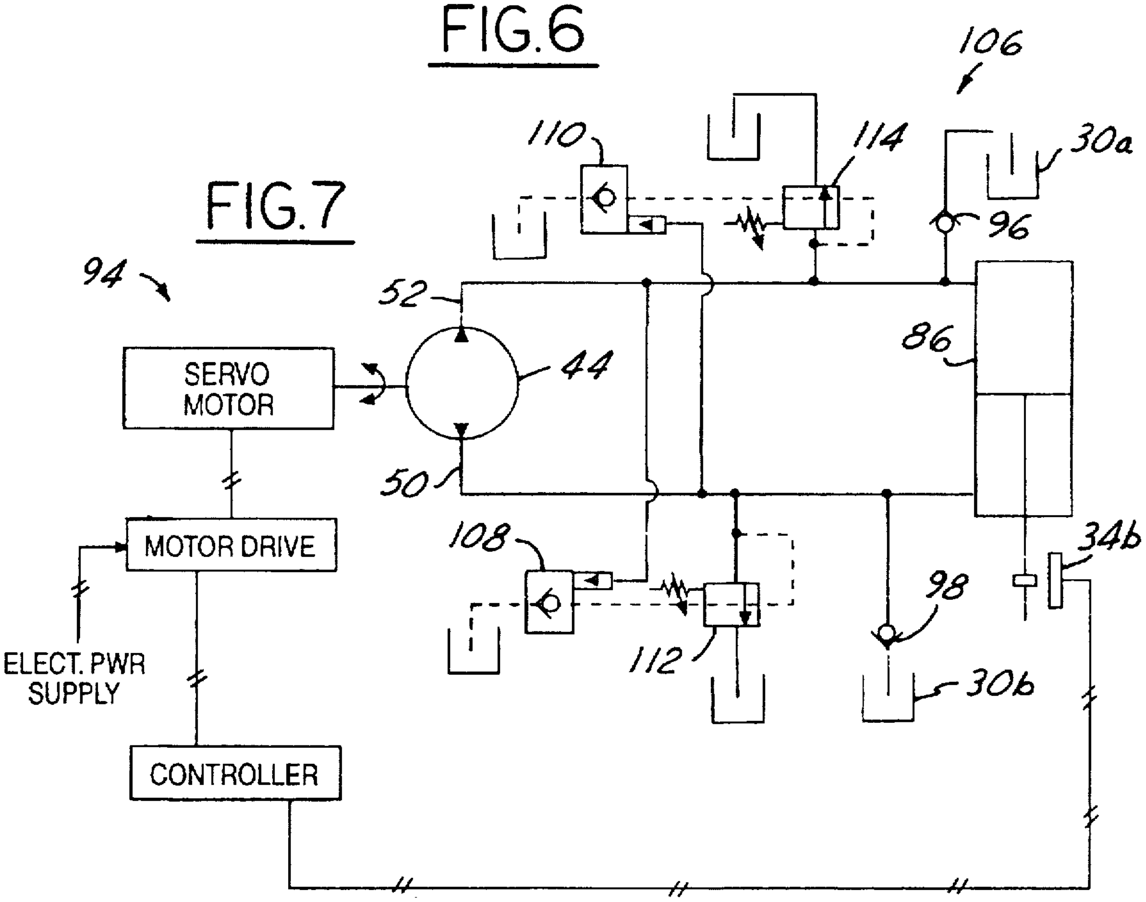

FIG. 7 illustrates a system 106 that features flow control to and from actuator 86 by means of a pair of pilot-operated check valves 108, 110 that control the vent ports of a pair of two-stage pressure relief valves 112, 114. Pilot-operated check valves 108, 110 will open and permit fluid flow at lower pressure than sequencing or unloading valves 22, 24. Relief valves 112, 114 provide a relatively large cross section to fluid flow to the pump inlet or fluid sump. This large passage opening is accomplished at low pressure, as contracted with sequencing valves that provide an opening proportional to applied pressure. Relief valves 112, 114 also provide protection against over-pressurizing the input circuit to the actuator.

There has thus been provided an electrohydraulic control system, and an integrated bidirectional electric-motor/hydraulic-pump unit for use therein, which fully satisfy all of the aims previously set forth. In each disclosed embodiment, control of motion at the actuator is obtained by means of electronic control of electrical power applied to the pump, both in terms of magnitude and direction of electrical power. In each embodiment, the motor of the integrated motor/pump unit is controlled to provide only the hydraulic flow required to satisfy the requirements for motion at the load. The rate of fluid flow is controlled as a function of motor speed, which in turn may be controlled by means of any suitable electronic method, such as by controlling frequency applied if the motor is an ac motor. Direction of rotation at the motor is controlled in order to control direction of motion at the actuator and load. Fluid pressure is controlled by controlling amplitude of current applied to the motor. Control electronics 32 may operate in any suitable conventional mode, such as position, velocity and/or acceleration control modes. The motor drive electronics 36 may be likewise be operated in any suitable conventional mode, such as a variable frequency control mode or power vector control mode. The pump motor may comprise an ac asynchronous brushless servo motor, an ac synchronous motor or a dc synchronous brushless servo motor, and the motor controller may correspondingly comprise an ac adjustable-speed drive, an ac servo drive or a dc brushless servo drive. The hydraulic pumps may be of any suitable conventional type, such as fixed displacement piston pumps, fixed displacement vane pumps or fixed displacement gear pumps.

We claim:

1. An electrohydraulic control system that comprises:

bidirectional electric motor means responsive to application of electrical power for rotation in either of two directions, hydraulic pump means coupled to said electric motor means and having ports for supplying hydraulic fluid in either of two flow directions as a function of direction of rotation of said electric motor means, hydraulic actuator means coupled to said ports of said hydraulic pump means for receiving fluid in either of two flow directions and performing work as a function thereof, and electronic control means for applying electrical power to said electric motor means so as to obtain a desired work at said actuator means, said bidirectional electric motor means comprising a fluid-cooled motor having a housing with ports for feeding fluid through said housing, and said system further including means for routing hydraulic fluid through said motor housing between said pump means and said actuator means.

2. The system set forth in claim 1 further comprising valve means operatively coupled to said pump means and said actuator means for controlling flow of hydraulic fluid between said pump means and said actuator means.

3. The system set forth in claim 2 wherein said valve means comprises passive hydraulic valve means responsive to direction and/or pressure of hydraulic fluid flow for controlling fluid flow between said motor means and said actuator means.

4. The system set forth in claim 3 wherein said valve means comprises sequencing valve means for controlling direction of fluid flow through said actuator means is selected from the group consisting of pilot-operated check-valves, pilot-operated sequencing valves and pilot-operated unloading valves.

5. The system set forth in claim 4 wherein said valve means comprise pilot-operated check valves that control vent ports of associated two-stage pressure relief valves.

6. The system set forth in claim 3 wherein said pump means has at least two fluid ports, and wherein said valve means comprises check valve means for controlling direction of fluid flow between said fluid ports and said actuator means.

7. The system set forth in claim 1 wherein said bidirectional electric motor means has a motor output shaft, and wherein said hydraulic pump means comprises bidirectional hydraulic pump means coupled to said shaft.

8. The system set forth in claim 7 wherein said bidirectional hydraulic pump means comprises a bidirectional pump directly coupled to said shaft.

9. The system set forth in claim 8 wherein said bidirectional pump has a pair of fluid ports that alternatively function as inlet and outlet ports depending upon direction of rotation of said motor output shaft, and wherein said system further comprises valve means responsive to direction and/or pressure of hydraulic fluid flow for controlling fluid flow between said actuator means and said pump ports.

10. The system set forth in claim 9 wherein said actuator means has a pair of fluid ports, said valve means also being responsive to direction and/or pressure of hydraulic fluid flow for controlling fluid flow to said actuator fluid ports.

11. The system set forth in claim 7 wherein said bidirectional hydraulic pump means comprises a pair of unidirectional hydraulic pumps and a pair of directional couplers respectively connecting said pumps to said motor output shaft such that said pumps are alternately coupled to said shaft as a function of direction of rotation of said shaft.

12. The system set forth in claim 11 wherein each of said unidirectional pumps has an inlet port and an outlet port, and wherein said system further comprises valve means responsive to direction and/or pressure of hydraulic fluid flow for controlling fluid flow between said actuator means and said pump ports.

13. The system set forth in claim 7 wherein said bidirectional motor means has one or more endplates into which said motor output shaft extends, and wherein said hydraulic pump means is mounted on said one or more endplates to form a unitary assembly with said motor means.

14. The system set forth in claim 13 further comprising a sound-deadening enclosure surrounding and enclosing said unitary assembly.

15. The system set forth in claim 1 wherein said electronic control means includes sensor means operatively coupled to said actuator means for applying electrical power to said motor means as a function of motion at said actuator means.

16. The system set forth in claim 1 wherein said electric motor means comprises an electric motor selected from the group consisting of: ac synchronous brushless servo motors, ac asynchronous motors, and dc synchronous brushless servo motors.

17. The system set forth in claim 1 wherein said hydraulic pump means comprises at least one hydraulic pump selected from the group consisting of: fixed displacement piston pumps, fixed displacement vane pumps, and fixed displacement gear pumps.

18. The system set forth in claim 1 wherein said electronic control means is selected from the group consisting of: ac adjustable speed drives, ac servo drives, and dc brushless servo drives.

19. The system set forth in claim 18 wherein said electronic control means includes means for operating in at least one control mode selected from the group consisting of: variable frequency control and power vector control.

20. The system set forth in claim 1 wherein said actuator means is selected from the group consisting of: single rod linear actuators, double rod linear actuators, and bidirectional rotary actuators.

21. An electrohydraulic control system that comprises:

bidirectional electric motor means responsive to application of electrical power for rotation in either of two directions, hydraulic pump means coupled to said electric motor means and having ports for supplying hydraulic fluid in either of two flow directions as a function of direction of rotation of said electric motor means, hydraulic actuator means coupled to said ports of said hydraulic pump means for receiving fluid in either of two flow directions and performing work as a function thereof, and electronic control means for applying electrical power to said electric motor means so as to obtain a desired work at said actuator means, said bidirectional electric motor means having a motor output shaft, and said hydraulic pump means comprising bidirectional hydraulic pump means coupled to said shaft, said bidirectional motor means having one or more endplates into which said motor output shaft extends, said hydraulic pump means being mounted on said one or more endplates to form a unitary assembly with said motor means, said bidirectional electric motor means comprising a fluid-cooled motor having a housing with ports for feeding fluid through said housing, and said system further including means for routing hydraulic fluid through said motor housing between said pump means and said actuator means.

22. The system set forth in claim 21 wherein said electronic control means is mounted on said motor housing in such a way as to be cooled by passage of fluid through said motor housing.

23. An electrohydraulic control system that comprises:

bidirectional electric motor means responsive to application of electrical power for rotation in either of two directions, hydraulic pump means coupled to said electric motor means and having ports for supplying hydraulic fluid in either of two flow directions as a function of direction of rotation of said electric motor means, hydraulic actuator means coupled to said ports of said hydraulic pump means for receiving fluid in either of two flow directions and performing work as a function thereof, and electronic control means for applying electrical power to said electric motor means so as to obtain a desired work at said actuator means, said bidirectional electric motor means having a motor output shaft, and said hydraulic pump means comprising bidirectional hydraulic pump means coupled to said shaft, said bidirectional hydraulic pump means comprising a pair of unidirectional hydraulic pumps and a pair of directional couplers respectively connecting said pumps to said motor output shaft such that said pumps are alternately coupled to said shaft as a function of direction of rotation of said shaft, each of said unidirectional pumps having an inlet port and an outlet port, and said system further comprising valve means responsive to direction and/or pressure of hydraulic fluid flow for controlling fluid flow between said actuator means and said pump ports.

24. The system set forth in claim 23 wherein said actuator means has a pair of fluid ports, said valve means also being responsive to direction and/or pressure of hydraulic fluid flow for controlling fluid flow to said actuator fluid ports.

25. The system set forth in claim 23 wherein said bidirectional electric motor means comprises a fluid-cooled motor having a housing with ports for feeding fluid through said housing, and wherein said system further includes means for routing hydraulic fluid through said motor housing between said pump means and said actuator means.

26. The system set forth in claim 1 wherein said bidirectional electric motor means comprises a fluid-cooled motor having a housing with ports for feeding fluid through said housing, and wherein said system further includes means for routing hydraulic fluid through said motor housing between said pump means and said actuator means.

27. An electrohydraulic control system that comprises:

bidirectional electric motor means responsive to application of electrical power for rotation in either of two directions, hydraulic pump means coupled to said electric motor means and having ports for supplying hydraulic fluid in either of two flow directions as a function of direction of rotation of said electric motor means, hydraulic actuator means coupled to said ports of said hydraulic pump means for receiving fluid in either of two flow directions and performing work as a function thereof, electronic control means for applying electrical power to said electric motor means so as to obtain a desired work at said actuator means, and valve means operatively coupled to said pump means and said actuator means for controlling flow of hydraulic fluid between said pump means and said actuator means, said valve means comprising pilot-operated passive hydraulic check valves responsive to direction and/or pressure of hydraulic fluid flow to control vent ports of associated pressure relief valves and thereby control fluid flow between said motor means and said actuator means.

28. An integrated electric-motor/hydraulic-pump unit that comprises:

a bidirectional electric motor having a motor output shaft and at least one endplate into which said shaft extends, a hydraulic pump mounted on said endplate to form a unitary assembly with said motor, and a coupler connecting said shaft to said pump, said pump comprising a pair of unidirectional pumps, and said coupler comprising a pair of unidirectional couplers that alternately connect said pump to said shaft as a function of direction of rotation of said shaft, said motor having a pair of endplates, and said pair of pumps being mounted on respective ones of said endplates.

29. The unit as set forth in claim 28 wherein said electric motor comprises a fluid-cooled motor having a housing with ports for feeding fluid through said housing, and wherein said unit further comprises means for routing hydraulic fluid between said motor housing and said pump.

30. The unit set forth in claim 29 further comprising electronic control means for applying electrical power to said electric motor so as to obtain a desired output from said pump, and means mounting said electronic control means to said motor housing so as to be cooled by fluid fed through said housing.

31. The unit set forth in claim 30 further comprising a sound-deadening enclosure surrounding and enclosing said unitary assembly.

* * * * *